United States Patent [19]
Sokolow

[11] 3,891,371
[45] June 24, 1975

[54] FLUID DISTRIBUTOR FOR ROTARY BLOW MOLDING

[75] Inventor: Nicholas N. Sokolow, Roscoe, Ill.

[73] Assignee: Plasti-Mac, Inc., Longwood, Fla.

[22] Filed: Apr. 30, 1973

[21] Appl. No.: 355,657

[52] U.S. Cl. ......... 425/233; 425/326 B; 425/387 B; 425/DIG. 204
[51] Int. Cl. .............................................. B29c 5/00
[58] Field of Search.......... 425/DIG. 204, 205, 233, 425/326 B, 387 B; 308/36.1, 36.2

[56] References Cited
UNITED STATES PATENTS

| | | | |
|---|---|---|---|
| 3,069,722 | 12/1962 | Kato | 425/DIG. 205 |
| 3,365,748 | 1/1968 | Cote | 425/387 B |
| 3,718,378 | 2/1973 | Clay | 308/36.1 |
| 3,767,341 | 10/1973 | Sebholf | 425/DIG. 205 |

Primary Examiner—Andrew R. Juhasz
Assistant Examiner—Leon Gilden
Attorney, Agent, or Firm—Larson, Taylor and Hinds

[57] ABSTRACT

A blow molding apparatus in which one, but preferably a plurality of blow molds are mounted on a pair of opposed plates which rotate, carrying the molds with them, as the mold dies thereof reciprocate towards and away from each other to open and close the mold cavities under the action of hydraulic piston and cylinder units. Oil to and from the units passes through a distributor shaft in a rotating sleeve, on which shaft high and low pressure grooves are separated axially from each other. Air and water lines for blowing and cooling, respectively, also pass through the sleeve, these lines passing through rotary unions to distributor manifolds separate from the distributor shaft and rotatable with the sleeve.

32 Claims, 9 Drawing Figures

3,891,371

FLUID DISTRIBUTOR FOR ROTARY BLOW MOLDING

BACKGROUND OF THE INVENTION

This invention relates to a rotary blow molding apparatus of the type disclosed in the Cote U.S. Pat. No. 3,365,748, issued Jan. 30, 1968, which patent is incorporated by reference herein for its teaching of this basic apparatus. The present invention relates in particular to a fluid distribution system for such an apparatus.

In a rotary blow molding apparatus of the type disclosed in the said Cote patent, the molds themselves rotate about an axis. This in and of itself creates design problems since pressurized oil (for reciprocating the mold dies towards and away from each other), pressurized air (for expanding the preform within the mold cavity) and water (for cooling the mold dies) must be brought to each of the blow molds even as they are rotating about the axis of the apparatus. This problem is satisfied in the apparatus of the Cote patent by an arrangement wherein the various fluids are delivered to a stationary fluid distributor from which the fluids pass through apertures in a sleeve which rotates with the rotating plates.

While in theory, this arrangement is sound, in practice, it has been found to include several disadvantages. Firstly, the distributor shaft disclosed in the this previous patent includes a pair of oil grooves, each of which includes, in the same radial plane, a first groove portion connected to a pressurized oil source for delivering pressurized oil and a second groove portion connected to a reservoir or the like for draining low pressure oil. Consequently, the opening in the sleeve located in the radial plane and connected with the piston and cylinder units are alternately connected to pressure and drain grooves. Presently, the pressure and drain grooves are separated by less than an inch of a metal to metal fit between the exterior of the shaft between the groove portions and the interior of the sleeve. Even when the apparatus is new, there is a clearance of approximately 0.0015 to 0.0030 inches. This is sufficient for the existence of some leakage between the high and low pressure portions of the groove.

Another disadvantage of this present fluid distribution system concerns the arrangement for distributing air and water. Both of these fluids are delivered through grooves in the periphery of the distributor shaft in a manner similar to the oil distribution except that in the case of blowing air and cooling water, there is no requirement for sequential distribution as is the case with the oil. That is, with both oil and water, the connection from the lines entering the distributor shaft to the apertures in the sleeve leading to the blow molds is continuously open. Thus, the provision of air and water lines in the distributor shaft result not from a need for sequential flow of these fluids, but rather because it appeared to greatly simiplify the overall apparatus to simply include these fluid flow paths within the distributor shaft. However, in practice this "simple" solution has proved to be quite troublesome and expensive. Because of these air and water passages, the distributor shaft itself became unnecessarily large, and required a precision fit over a considerable axial length of the distributor shaft. In operation, the ater and air seals are the shortest lived items since neither water nor air provide adequate lubrication for the O-rings which were used as dynamic seals.

Thus, there exists a need, in a blow molding apparatus of the type described, for a new and improved arrangement for distributing the fluids which will overcome the disadvantages of the previous arrangement.

SUMMARY OF THE INVENTION

Thus, it is a purpose of the present invention to provide, in a rotary blow molding apparatus of the type described, a new and improved arrangement for distributing the fluids to and from the blow molds.

This purpose of the present invention has been achieved by providing a fluid distributor including, for the flow of high and low pressure fluid to the piston and cylinder units, a distributor shaft wherein the high and low pressure grooves on the surface thereof are separated axially from each other. Thus, wherein high and low pressure grooves were located in the same radial plane, in the present invention such high and low pressure grooves are separted axially, whereby an efficient and relatively inexpensive O-ring seal can very easily be placed on the distributor shaft, efficiently separating the high and low pressure grooves from each other, thus vastly reducing the amount of oil leakage. One significant advantage of this arrangement is that the fit between the distributor shaft and and the interior of the sleeve need not be as precise, and it of course follows that these parts may now be manufactured more economically.

Since the clearance between the sleeve interior and the distributor shaft exterior might be larger than with the previous arrangement, it may be possible to insert in each of the sleeve apertures a bushing seal through which the oil can pass, which seal might be floating in this aperture and spring biased against the exterior of the distributor shaft.

In a preferred arrangement, four grooves would be provided, all of them spaced axially from each other. A first set would comprise main pressure and drain grooves for pressurizing one side of the piston and draining the other side of the piston concurrently for closing the mold, while the third and fourth grooves would be connected to introduce pressurized fluid to the said other side and drain the said one side for opening the mold. Normally a separate piston and cylinder unit is provided for each mold half of a given mold. With the present arrangement, a single distributor shaft on one side of the apparatus could serve to operate both of the piston and cylinder units of a given mold concurrently.

in accordance with another feature of the invention, air may be delivered through the same side on which the single distributor shaft is located while water inlet and outlet pipes may enter the sleeve from the opposite side of the apparatus.

In accordance with another feature of the present invention, the stationary air and water pipes are directed into the sleeve and passed through rotary unions which are in turn connected with manifolds within the sleeve which simply rotate with the sleeve. This arrangement thereby completely eliminates the myriad of problems in the previous arrangement resulting simply from the fact that water and air were distributed through the main distributor shaft. Any problems associated with water and air distribution will be simple plumbing problems in contrast with the previous arrangement wherein expensive seals had to be replaced.

Thus, it is a purpose of this invention to provide, in an apparatus of the type described, a new improved arrangement for distributing fluids to the molds.

It is still another object of this invention to provide, in a rotary blow molding apparatus of the type described, a new and improved arrangement for distributing high and low pressure oil to and from the piston and cylinder units which operate the blow molds.

It is another object of this invention to provide a simplified arrangement including rotary unions and manifolds for delivering air and water to the blow molds so as to elinate the problems which existed heretofore when such fluids were distributed through the main distributor shaft.

It is another object of this invention to provide, in a rotary blow molding apparatus of the type described, a new and improved fluid distribution arrangement wherein oil and air are delivered from one side while water is delivered and removed at the other side of the apparatus.

It is still another object of this invention to provide, in a rotary blow molding apparatus of the type described, an oil distribution arrangement wherein the oil is distributed via a stationary distributing shaft having oil distribution grooves on the surface thereof, which grooves sequentially register with apertures in the sleeve, and wherein the high and low pressure grooves are paced axially from each other along the distributor shaft.

Other objects and advantages of the present invention will become apparent from the detailed description to follow, together with the accompanying drawing.

BRIEF DESCRIPTION OF THE DRAWINGS:

There follows a detailed description of a preferred embodiment of the invention to be read together with the accompanying drawings wherein.

DETAILED DESCRIPTION OF THE PREFERRED EMBODIMENT

Figure 1:
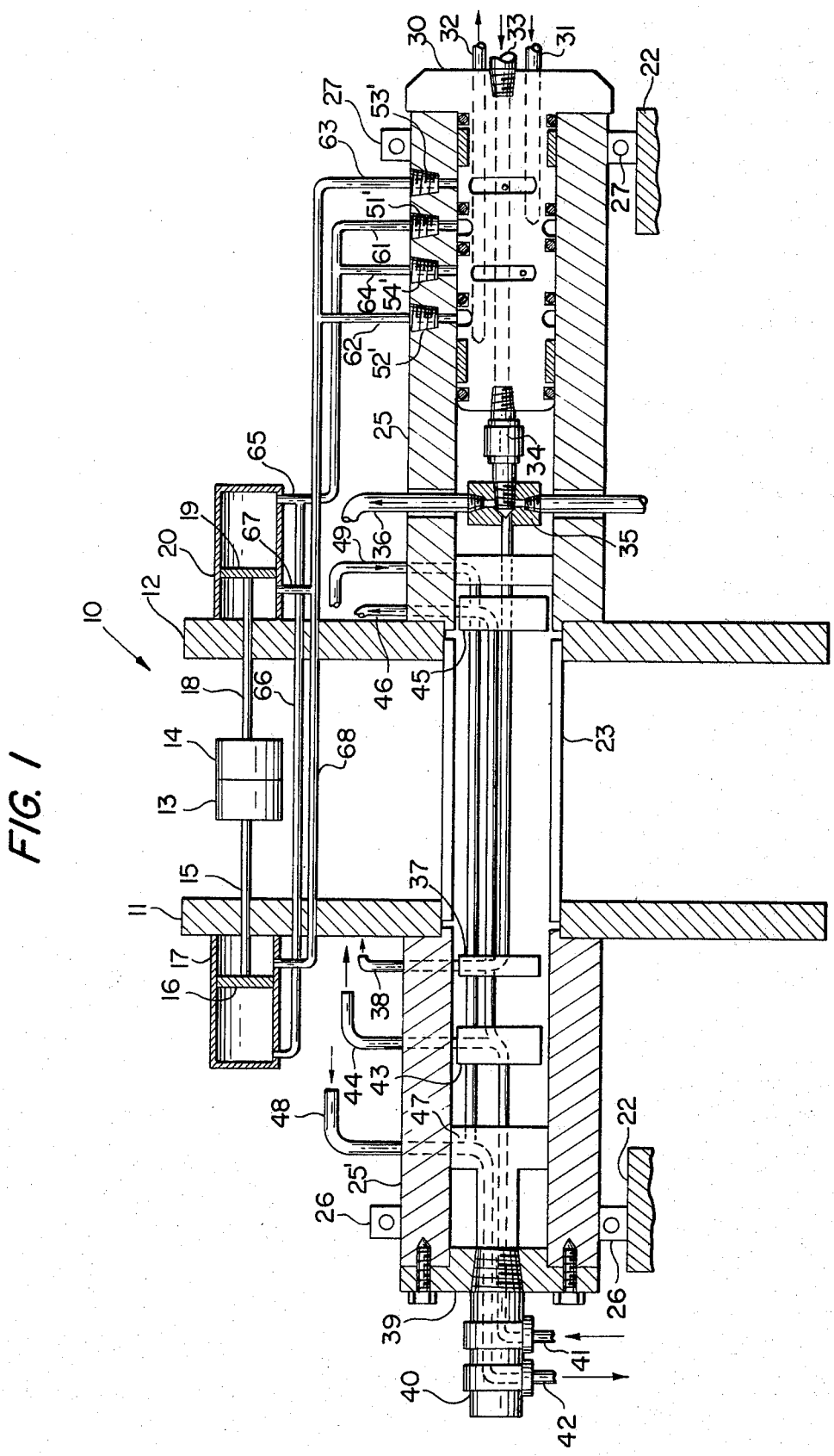
FIG. 1 is an axial sectional view through a rotating blow molding apparatus of the type shown in the said Cote U.S. Pat. No. 3,365,748, the drawing illustrating in detail only the rotating portion of the apparatus, the remaining portion being omitted for purposes of clarity.
Figure 2:
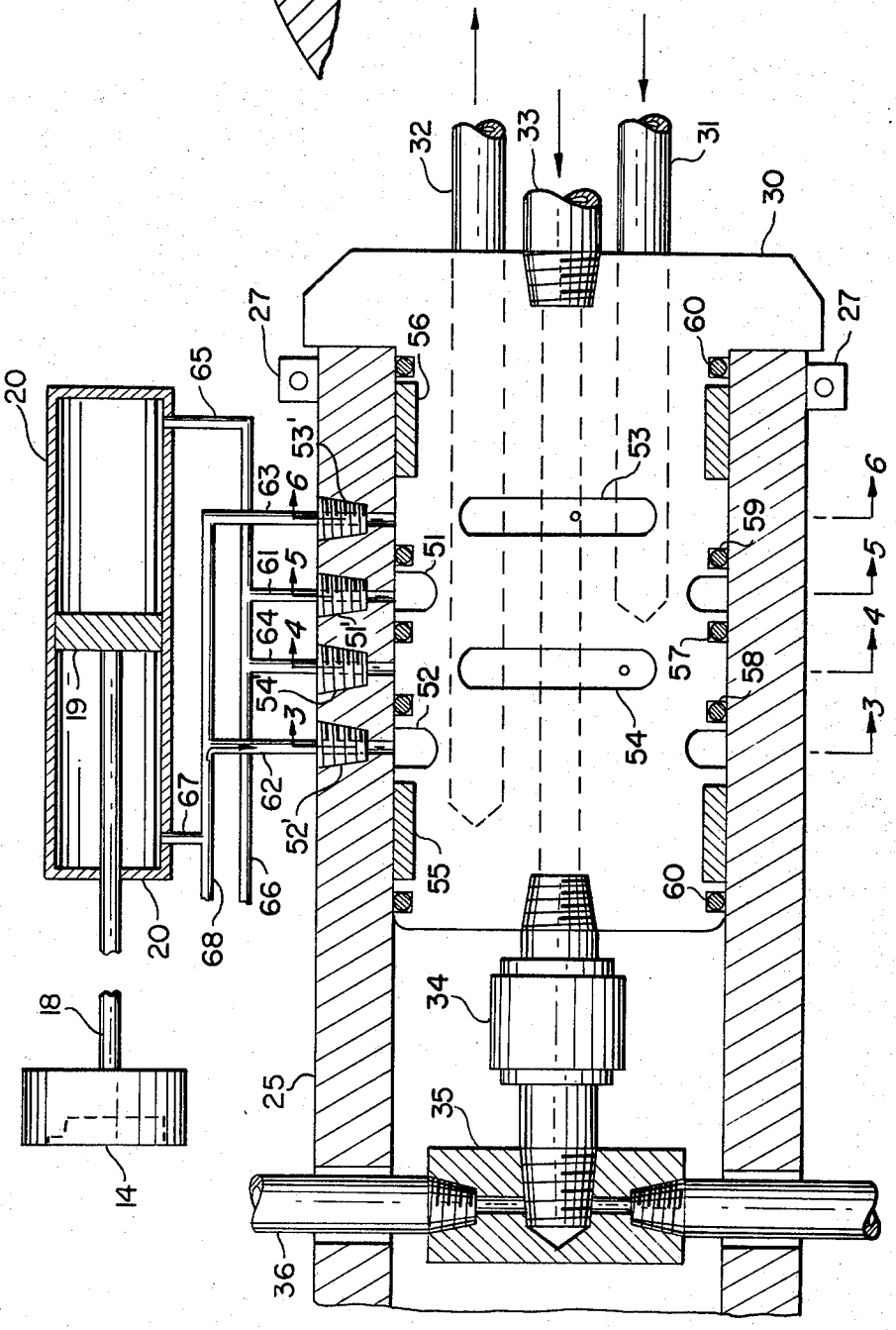
FIG. 2 is an enlarged sectional view of the right hand end of FIG. 1.
Figure 3:
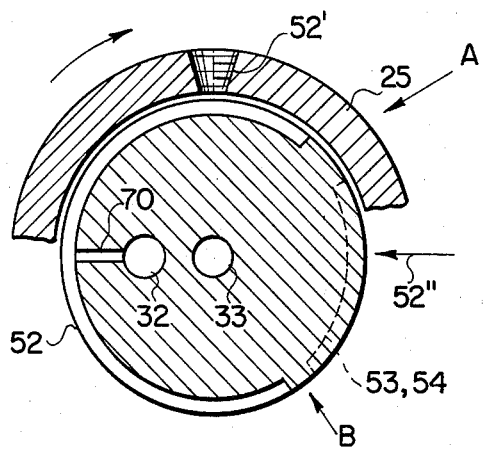
FIGS. 3, 4, 5 and 6 are sectional views taken along line 3—3, 4—4, 5—5, and 6—6, respectively of FIG. 2.
Figure 4:
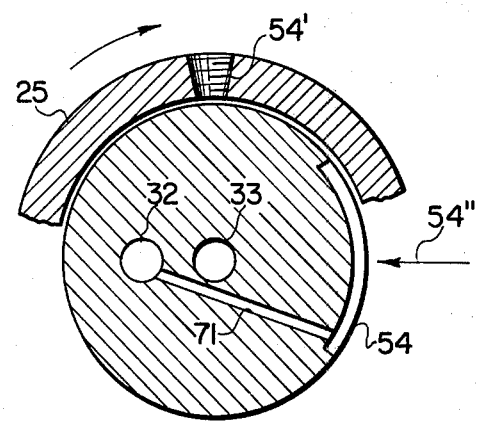
Figure 5:
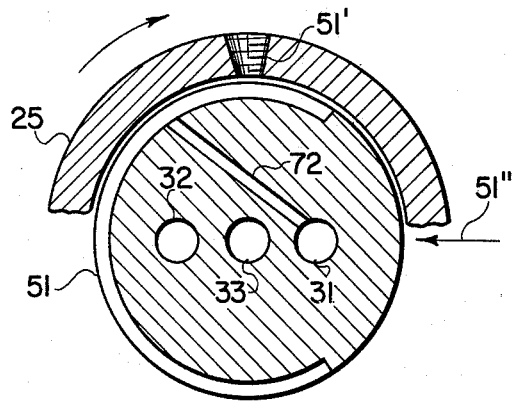
Figure 6:
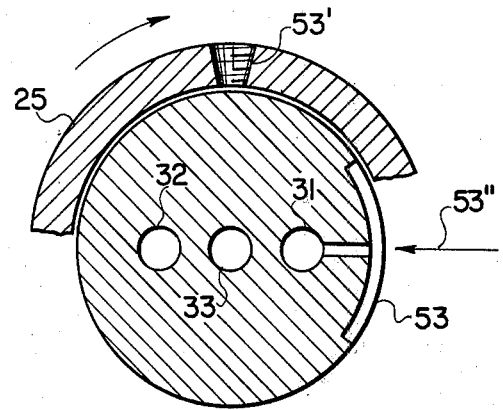

Referring now to the drawings, like elements are represented by like numerals throughout the several views. the overall apparatus, as shown in FIG. 1 and 2 in the Cote U.S. Pat. No. 3,365,748, includes a base structure on which is mounted the rotary portion, the latter including a pair of opposed plates on which the molds are mounted, a rotary sleeve, and the necessary fluid lines leading to the mold dies on the mold plates. Since the present invention relates essentially to the fluid distribution system, the entire fixed base of the overall apparatus is represented in FIG. 1 of the present application by the representation 22 of fixed surfaces on which the rotary elements are rotatably mounted by means of ball bearing supports 26 and 27.

Moreover, it will be understood that in practice a plurality of mold pairs will be mounted on the mold plates. For example, in the Cote patent, three pairs of mold dies are shown. Clearly, the overall apparatus could include more or less mold die pairs. However, to simplify the present application, only a single blow mold, i.e. a single pair of mating mold dies will be illustrated. As will be discussed in greater detail below, for the set of mold dies illustrated herein, a set of apertures will be provided through the rotary sleeve housing for oil, air and water. It will be understood that a separate set of such apertures will be provided for each additional pair of mold dies, the additional set or sets being equally spaced about the circumference of the sleeve.

Referring now to FIG. 1, there is shown the rotary portion 10 of a rotary blow molding apparatus which includes a pair of rotary plates 11 and 12 mounting, respectively, mold dies 13 and 14 which form a mating pair. Mold die 13 is connected to a piston rod 15 which at its opposite end is connected to a piston 16 which is reciprocably mounted within said cylinder 17, the latter being rigidly connected to the outer surface of plate 11. Similarly, the mold die 14 is fixed to piston rod 18 which at its opposite end is connected to piston 19 which reciprocates within fixed cylinder 20.

Plates 11 and 12 are fixedly mounted for rotation with a hollow central shaft 23. Also fixedly connected to plates 11 and 12 and hollow shaft 23 for rotation therewith are a pair of sleeve housings 25 and 25', these housings being rotatably supported on the base 22.

Extending into the right hand sleeve 25 is a hydraulic oil distributing shaft 30 which is fixed relative to the base 22. Referring to FIG. 2 and also FIGS. 3–6, this distributor shaft 30 includes an oil inlet channel 31 and an oil outlet channel 32. In addition, an air inlet pipe 33 passes completely through the distributor 30 into rotary union 34 from which the air passes to an air manifold 35 from which air passes through line 36 to the mold. If desired, and referring back to FIG. 1, an additional line can carry air to an additional air manifold 37 on the left hand side, from which air will pass through line 38 to the mold.

The distributor shaft 30 includes a pair of circumferential grooves 51 and 53 in communication with oil inlet channel 31. See also FIG. 5 and 6. These two grooves are always connected to the channel 31 and are never connected to the low pressure oil channel 32. Axially spaced from these grooves 51 and 53 are a further set of axially spaced grooves 52 and 54 which are in continuous communication with oil outlet channel 32 and which do not communicate at all with oil inlet channel 31. See also FIG. 3 and 4. It will be noted that all four grooves are axially spaced from each other. Each of these grooves 51–54 has associated with it an aperture 51', 52', 53', 54', respectively, in the sleeve housing 25. Grooves 51 and 52 are arranged to communicate with their respective apertures 51' and 52' for delivering pressurized oil and removing low pressure oil, respectively, for closing the mold while grooves 53 and 54 are arranged to supply pressurized oil and remove low pressure oil via their respective grooves 53' and 54' for opening the mold. The first set of grooves 51 and 52 are of course of a greater circumferential extent because the mold closing force must be applied not only to close the mold, but also during the blowing and cooling steps.

In FIGS. 3–6, the arrows 51''–54'' illustrate the position of the apertures 51'–54' when the sleeve 25 has turned clockwise 90° from the illustrated position, at which 90° position the mold is being opened.

By separating all of the grooves axially, the present invention eliminates the significant problem which has existed heretofore of leakage over the small piece separating high and low pressure grooves within the same radial plane. Since grooves at different pressures are now separated axially, a high quality seal can be achieved by placing between the high and low pressure grooges 51 and 54 a suitable O ring 57, i.e. it is no longer necessary to rely on metal to metal contact for sealing. For greater efficiency of operation, O ring seals 58 and 59 can be provided between the two low pressure grooves and the two high pressure grooves, respectively, although these are not quite as essential as the seal 57. The distributor shaft further includes split bearings 55 and 56, adjacent to which further O ring seals 60 are provided. In the present arrangement, only a single oil distributor shaft 30 is required, and hence the passages therethrough lead to both of the cylinders 17 and 20. Referring to FIGS. 1 and 2, the two passages 61 and 64 from apertures 51' and 54', respectively, communicate with a common line which leads at 65 to the cap end of the cylinder 20 while the line 66 leads to the cap end of cylinder 17. Similarly, the lines 62 and 63 from apertures 52' and 53' respectively, intersect a common line which leads at 67 to the rod end of cylinder 20 and line 68 which leads to the rod end of cylinder 17. It will be noted that the lines 61 and 64, and hence the apertures 51' and 54' are in communication with each other. This is feasible because while either of these apertures are communicating with their respective grooves, the other of these two apertures lies against the cylindrical outer surface of distributor shaft 30. The same is true with respect to communicating apertures 52' and 53'.

Figure 9:
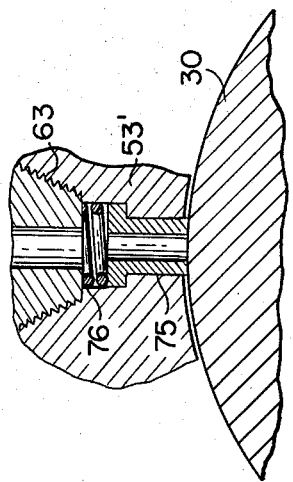
FIG. 9 is a partial sectional view along line 6—6 of FIG. 2, but enlarged and showing in detail another feature of the invention.

To assure that the particular one of the two communicating apertures not currently communicating with a grooove in fact remains closed, an insert may be provided in the aperture as shown in FIG. 9. A floating bushing seal 75 is urged against the surface of shaft 30 by a spring 76 which abuts the end of a fitting which in fact would form the end of line 63. This bushing can of course be provided in any one or in all of the apertures 51'–54'. Another significant advantage of the present invention is that the air and water distribution system has been removed from the distributor shaft, thus eliminating all of the maintenance problems which were caused thereby. The air distribution system has been described above. The water distribution system includes a pair of water inlet and outlet pipes 41 and 42 which are fixed relative to the base 22 and which enter a rotary union 40 which is connected to an end plate 39 which is in turn fixed to the sleeve portion 25'. The incoming water passes into manifolds 43 and 45 from which water passes out through apertures in the sleeve portions 25' and 25 through lines 44 and 46, respectively. Similarly, returning water through lines 48 and 49 pass through manifolds 47 and 45, respectively and then back through the rotary union 40. It will be understood that all fluid lines between rotary unions 34 and 40 rotate with the other rotating parts. As explained earlier, it will also be understood that additional lines 48, 44, 38, 46, 49 and 36 will extend from their respective manifolds through the sleeve portions 25' and 25 for each additional pair of mold dies mounted on the plates 11 and 12.

It will of course be understood that the water flow is continuous and for this reason no means are necessary for starting and stopping said flow. On the other hand, the air flow is of course discontinuous since the pressurized air is required only at certain times. However, as shown in the said Cote U.S. Pat. No. 3,365,748, no control means are provided within the sleeve housings 25' and 25. Rather, the air control means is provided by means exterior of these sleeves to which the air through lines 36 and 38 is delivered. Such a means is shown in detail in the said Cote patent.

Figure 7:
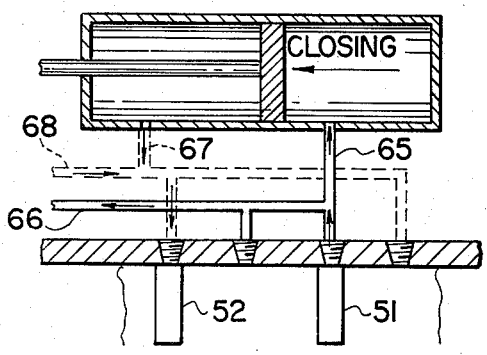
FIGS. 7 and 8 illustrate schematically, the fluid lines between the distributor shaft and a piston and cylinder unit, FIG. 7 illustrating the fluid flow while the mold is closing and FIG. 8 illustrating the fluid flow while the mold is being opened.
Figure 8:
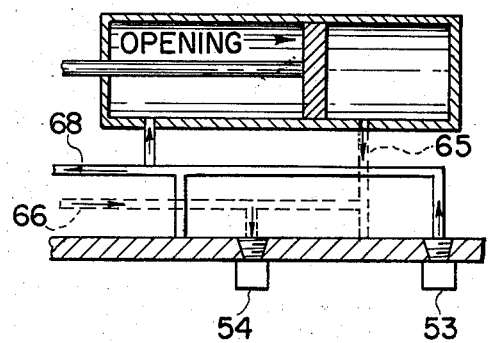

Although the operation of the invention will be apparent from the preceeding description of the apparatus, the operation will be briefly described hereinafter for purposes of clarity, and for this purpose references made to cross-sectional views 3–6, and also schematic views 7 and 8. Also, to assist in describing the operation of the invention arrows A and B have been added to FIG. rotate and the position of grooves 53 and 54 have been superimposed thereon in dotted lines. Assuming that the rotary parts rotate clockwise in FIG. 3–6 as shown by the arrow, the sleeve will reach a point at which the apertures are approximately at the point indicated by arrow A immediately after which the apertures 53' and 54' communicate with their respective grooves 53 and 54. Referring now to FIG. 8 wherein the high pressure lines are shown as solid lines and the low pressure lines are dotted lines, this will cause fluid to flow to the rod ends of cylinders 17 and 20 and to drain the cap ends thereof whereby the mold dies 13 and 14 will separate from each other. It will be noted that this mold opening position is located on the right hand portion of shaft 30 between approximately the 2 o'clock position and the 4 o'clock position, i.e. approximately 60°. Since the mold dies are arranged on the present type of apparatus with their longitudinal axes extending essentially perpendicular to a radius, then in the area where the grooves 53 and 54 are communicating with their respective apertures, the mold dies are essentially vertical and upright. This will facilitate ejection of the finished article and also vertical movement of a new parison into the space between the dies 13 and 14. When the apertures reach the position of arrow B, the aperture 53' and 54' start to communicate only with the cylindrical outer surface of the distributor shaft 30 while the apertures 51' and 52' communicate with their respective grooves 51 and 52. As shown in FIG. 7 wherein the pressurized lines are solid and the low pressure lines are dotted, fluid now flows to the cap ends of these cylinders and out from the rod ends thereof whereupon the mold closing force is exerted for the full circumference of grooves 51 and 52 which is about 240°, i.e. approximately from position B all the way around to position A. During the first portion of this stage the article is being blown and during the latter portion the blown article is being cooled. In the precise position as shown in the figures, the blown article is completing its cooling stage shortly after which the sleeve apertures will reach position A and the mold will again be opened.

Although the invention has been described in considerable detail with respect to preferred embodiments thereof, it will be apparent that the invention is capable of numerous modifications and variations apparent to those skilled in the art without departing from the spirit and scope of the invention as defined in the claims.

I claim:

1. A blow molding apparatus comprising: a base, a pair of opposed spaced apart plates rotatably mounted on the base for rotation about an axis in synchronism with each other, at least one pair of opposed mold dies having recesses which form a blow mold cavity when the dies are closed against each other, said mold dies being operatively connected to the plates for rotation therewith and mounted between the plates for movement towards and away from each other, to close and open the mold cavity, respectively, power means for closing said mold dies, said power means being operatively connected to the plates to rotate therewith, and a distributor means for distributing oil to and from the said power means, said distributor means comprising:

a hollow sleeve coaxial with said axis and operatively connected to the plates for rotation therewith, said sleeve including apertures therethrough, a stationary fluid distributing shaft within the sleeve, first passage means for delivering pressurized fluid into the distributor shaft, second passage means for removing low pressure fluid from the distributor shaft, axially spaced grooves in said shaft selectively mating with said apertures in the sleeve for communicating said power means with said first and second passage means, the tolerance between the surface of the distributor shaft and the interior of the sleeve being too large to serve as a fluid seal between the respective grooves, and including O ring seals on the distributor shaft separating the grooves from fluid communication with each other, and bearing means for forming the sole wear surface between the distributor shaft and the hollow sleeve, said bearing means comprising a pair of bearing rings removably mounted on one of said distributor shaft or hollow sleeve so as to form the sole wear surface of that member with the other of said distributor shaft or hollow sleeve.

2. A blow molding appparatus according to claim 1, said bearing rings being removably mounted on the distributor shaft.

3. A blow molding apparatus according to claim 1, said bearing rings being split rings.

4. A blow molding apparatus accordint to claim 1, said bearing rings also containing fluid seals for preventing the flow of liquid thereacross.

5. A blow molding apparatus comprising: a base, a pair of opposed spaced apart plates rotatably mounted on the base for rotation about an axis in synchronism with each other, at least one pair of opposed mold dies having recesses which form a blow mold cavity when the dies are closed against each other, said mold dies being operatively connected to the plates for rotation therewith and mounted between the plates for movement towards and away from each other, to close and open the mold cavity, respectively, fluid operated power means for closing said mold dies, said power means being operatively connected to the plates to rotate therewith, and a distributor means for distributing fluid to and from the said power means, said distributing means comprising:

a hollow sleeve coaxial with said axis and operatively connected to the plates for rotation therewith, first and second axially spaced fluid apertures through said sleeve, a stationary fluid distributing shaft within the sleeve, first passage means for delivering pressurized fluid into the distributor shaft, second passage means for removing low pressure fluid from the distributor shaft, pressure means including a first groove in the distributor shaft for delivering pressurized fluid from said first passage through said first aperture in the sleeve to the power means, and an exhaust means including a second groove in the distributor shaft spaced axially from the said first groove for removing low pressure fluid from the power means through said second fluid aperture in the sleeve, the surface of the distributing shaft bounded by planes perpendicular to the shaft axis and defining the axial limits of the first groove being completely free of any communication from said surface into the shaft to the second passage, and the surface of the shaft bounded by planes perpendicular to the shaft axis and defining the axial limits of the second groove being completely free of any communication from said surface into the shaft to the first passage.

6. A blow molding apparatus accroding to claim 5, said power means comprising a piston and cylinder means, one side of the piston in the piston and cylinder means being connectable to the first opening for delivering a pressurized fluid to close the mold while the other side of the piston is connected to the second passage for removal of low pressure fluid therefrom.

7. A blow molding apparatus according to claim 5, said distributor means further including mold opening means for delivering pressurized fluid to said other side of the piston and for removing low pressure oil from the said one side to move the mold dies apart to open the mold cavity.

8. A blow molding apparatus according to claim 7, including third and fourth apertures in the sleeve spaced axially from each other and from said first and second openings, said mold opening means including third and fourth grooves in the distributor shaft spaced axially from each other and from the first and second grooves, the third groove being in continuous fluid communication with the first passage, and the surface of the distributing shaft bounded by planes perpendiculr to the shaft axis and defining the axial limits of the third groove being completely free of communication from said surface into the shaft to the second passage, and the fourth groove being in continuous fluid communication with the second passage, and the surface of the shaft bounded by planes perpendicular to the shaft axis and defining the axial limits of the fourth groove being completely free of communication with the first passage, the third groove being in fluid communication through the third aperture with the said other side of the piston and the fourth groove being in fluid communication through the fouth aperture with the said one side of the piston to move the mold dies apart to open the mold cavity.

9. A blow molding apparatus according to claim 8, said first and second grooves having an equal circumferential extend and positioned to communicate concurrently with the piston and cylinder means, and said third and fourth grooves having an equal circumferential extend and positioned to communicate concurrently with the piston and cylinder means when the first and second grooves are out of communication with the piston and cylinder means.

10. A blow molding apparatus according to claim 9, said first and second grooves extending circumferentially approximately 60°, and the third and fourth grooves extending circumferentially approximately 240°.

11. A blow molding apparatus according to claim 9, including an O-ring seal positioned on the shaft with those said grooves in communication with the first passages on one side thereof and those said grooves in communication with the second passages on the other side thereof.

12. A blow molding apparatus according to claim 9, said four grooves being positioned axially, second groove, fourth groove, first groove, and third groove, respectively, and including an O-ring seal on the distributor shaft between the fourth and first grooves.

13. A blow molding apparatus according to claim 12, including a further O-ring seal between the second and fourth grooves and a further O-ring seal between the first and third grooves.

14. A blow molding apparatus according to claim 5, including bearing means forming the sole wear surface between the distributor shaft and the interior of the hollow sleeve, said bearing means comprising a pair of bearing rings removably mounted on one of said distributor shaft or hollow sleeve so as to form the sole wear surface of that member with the other of said distributor shaft of hollow sleeve.

15. A blow molding apparatus according to claim 9, the four apertures through the sleeve being aligned in a common axial plane relative to the axis of the distributor shaft, the first and second grooves having an identical circumferential extent, the third and fourth grooves having an identical circumferential extent and the third and fourth grooves being spaced circumferentially from the first and second grooves.

16. A blow molding apparatus according to claim 15, said piston and cylinder means including a separate piston and cylinder unit for each mold die of the pair, each unit having a cylinder fixed to its respective plate and a piston rod therein connected to its respective mold die and to a piston in the cylinder, the said one side of the piston being the cap side, and the said other side of the piston being the rod side, said first, second, third and fourth apertures being in fluid communication with their respective sides of both said cylinders of the pair of mold dies for operating both mold dies simultaneously.

17. a blow molding apparatus according to claim 16, said sleeve including extensions extending axially outwardly beyond both plates, the distributor shaft being located in one of said extensions.

18. A blow molding apparatus according to claim 17, including cooling means for introducing and removing cooling water to the mold dies, said cooling means including means for introducing and removing water into and from the outer sleeve extensions, and means for delivering and receiving water between the said sleeve and both of the mold dies of the pair.

19. A blow molding apparatus according to claim 18, said cooling means including fixed inlet and outlet water pipes, further water pipes in the sleeve and rotatably therewith, a rotary union connecting the fixed and further water pipes, and a manifold rotatable with the sleeve for communicating the water with water apertures passing through the exterior of the sleeve, and water lines between the said water apertures and the mold dies.

20. A blow molding apparatus according to claim 19, including a fixed air line passing through said distributor shaft, a rotary manifold in the sleeve for delivering air to the blow molds, and a rotary union between the distributor shaft and the air manifold.

21. A blow molding apparatus according to claim 15, including a floating bushing seal in at least one of said apertures and means for biasing said bushing seal against the distributor shaft.

22. A blow molding apparatus according to claim 9, said first and second grooves each extending circumferentially for approximately 240°, and the third and fourth grooves each extending circumferentially for approximately 60°.

23. A blow molding apparatus according to claim 5, said first and second grooves having an equal circumferential extent about the distributor shaft, which extent is less than the full circumference of the distributor shaft.

24. A blow molding apparatus according to claim 23, the first and second apertures being aligned axially and the circumferential position of the first and second grooves being identical.

25. A blow molding apparatus according to claim 23, each of the said first and second grooves extending circumferentially for approximately 240°.

26. A blow molding apparatus according to claim 23, including a fixed air line extending through the distributor shaft, a rotary manifold in the sleeve for delivering air to the blow mold dies, and a rotary union between the distributor shaft and the air manifold.

27. A blow molding apparatus according to claim 5, said hollow sleeve including extensions which extend axially to both sides of a center plane bisecting the space between the plates, said power means including a piston and cylinder unit for each mold die of the pair, each cylinder of the unit being fixed to its respective plate and each piston of the unit being fixed to a piston rod which at its opposite end is fixed to its respective mold die, and wherein a single distributor shaft located in one of said extensions includes means for distributing pressurized fluid concurrently to operate both of the piston and cylinder units of the mold die pair.

28. A blow molding apparatus according to claim 27, including a fixed air line extending through said distributor shaft, a rotary manifold in the sleeve for delivering air to the blow mold dies, and a rotary union between the distributor shaft and the air manifold.

29. A blow mold apparatus according to claim 27, including cooling means for introducing and removing cooling water to and from the mold dies, said cooling means including means for introducing and removing water into and from the outer sleeve extension and means for delivering and receiving water between the said sleeve and both of the mold dies of the pair, said cooling means including fixed inlet and outlet water pipes, further water pipes in the sleeve and rotatable therewith, and a rotary union connecting the fixed and further water pipes, a manifold rotatable with the sleeve for communicating the water with water apertures extending through the exterior of the sleeve, and water lines between said water apertures and said mold dies.

30. A blow molding apparatus according to claim 27, including a means for introducing and removing air through the blow mold by an air line passing through the distributor shaft, and including means for delivering and removing cooling water through water lines located in the sleeve extension opposite from that extension having the distributor shaft, said water and air lines being connected to the sleeve for rotation therewith at the point where they pass air and water, respectively, through the exterior of the sleeve.

31. A blow molding apparatus according to claim 29, including water and air manifolds within the sleeve through which the water and air lines pass, respectively, and rotary unions between fixed portions of the air and water lines and their respective manifolds.

32. A blow molding apparatus according to claim 5, including an O-ring seal on the distributor shaft between the said first and second grooves.

* * * * *